US009554119B2

(12) United States Patent
Kira et al.

(10) Patent No.: US 9,554,119 B2
(45) Date of Patent: Jan. 24, 2017

(54) IMAGE GENERATION METHOD, IMAGE DISPLAY METHOD, STORAGE MEDIUM STORING IMAGE GENERATION PROGRAM, IMAGE GENERATION SYSTEM, AND IMAGE DISPLAY DEVICE

(71) Applicant: NINTENDO CO., LTD., Kyoto (JP)

(72) Inventors: Satoshi Kira, Kyoto (JP); Shinya Saito, Kyoto (JP); Yasushi Mikawa, Tokyo (JP)

(73) Assignee: NINTENDO CO., LTD., Kyoto (JP)

( * ) Notice: Subject to any disclaimer, the term of this patent is extended or adjusted under 35 U.S.C. 154(b) by 732 days.

(21) Appl. No.: 13/870,517

(22) Filed: Apr. 25, 2013

(65) Prior Publication Data

US 2014/0132706 A1 May 15, 2014

(30) Foreign Application Priority Data

Nov. 9, 2012 (JP) ................................ 2012-247337

(51) Int. Cl.
*H04N 13/02* (2006.01)
*H04N 13/00* (2006.01)

(52) U.S. Cl.
CPC ...... *H04N 13/0242* (2013.01); *H04N 13/0011* (2013.01); *H04N 13/0275* (2013.01)

(58) Field of Classification Search
CPC ............................ H04N 5/232; H04N 13/0242
USPC .......................................................... 348/36
See application file for complete search history.

(56) References Cited

U.S. PATENT DOCUMENTS

| 2004/0105597 | A1 | 6/2004 | Lelescu et al. |
| 2007/0097206 | A1* | 5/2007 | Houvener ............... G03B 35/08 348/26 |
| 2010/0295945 | A1* | 11/2010 | Plemons ................... B60R 1/00 348/148 |
| 2012/0154518 | A1* | 6/2012 | Zargarpour .......... G03B 17/565 348/36 |

FOREIGN PATENT DOCUMENTS

| JP | 2004-120095 | 4/2004 |
| JP | 2004-187298 | 7/2004 |
| JP | 2012-165102 | 8/2012 |

OTHER PUBLICATIONS

Japanese Notice of Reasons for Refusal for corresponding Japanese Application No. 2012-247337, mailed Aug. 31, 2016 (four pages).

* cited by examiner

*Primary Examiner* — Paulos M Natnael
*Assistant Examiner* — Justin Sanders
(74) *Attorney, Agent, or Firm* — Nixon & Vanderhye PC

(57) ABSTRACT

A method for generating a stereoscopic panorama image may include acquiring panorama images respectively captured by three or more panorama cameras located in a real space. A left-eye image and a right-eye image for stereoscopic display may be generated by synthesizing parts of the acquired panorama images. The generated left-eye image and the generated right-eye image may be displayed stereoscopically on a display.

16 Claims, 10 Drawing Sheets

F I G. 5
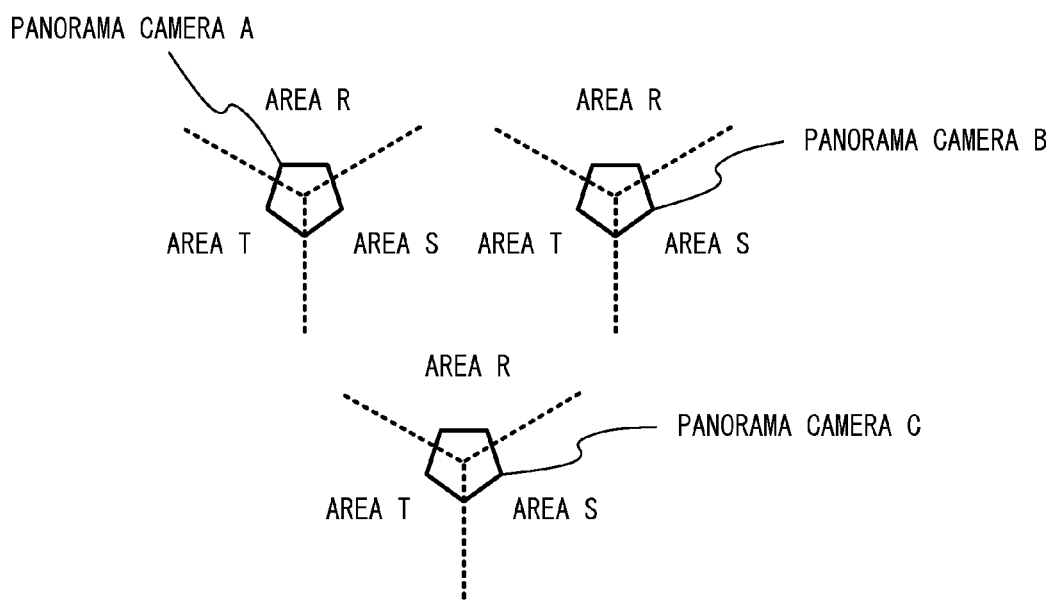

IMAGE GENERATION METHOD, IMAGE DISPLAY METHOD, STORAGE MEDIUM STORING IMAGE GENERATION PROGRAM, IMAGE GENERATION SYSTEM, AND IMAGE DISPLAY DEVICE

CROSS REFERENCE TO RELATED APPLICATION

The disclosure of Japanese Patent Application No. 2012-247337 filed on Nov. 9, 2012 is incorporated herein by reference.

FIELD

The technology described herein relates to an image generation method, an image display method, a storage medium storing an image generation program, an image generation system, and an image display device; and specifically, for example, to an image generation method, a storage medium storing an image generation program and an image generation system for generating a stereoscopic panorama image; and an image display method and an image display device capable of displaying a stereoscopic panorama image.

BACKGROUND AND SUMMARY

Conventionally, there is an image processing device for displaying a part of a panorama image or an omnidirectional image on a display device.

However, the above-described image processing device cannot acquire a stereoscopic panorama image.

Accordingly, an object of the example embodiment is to provide an image generation method, an image display method, a storage medium storing an image generation program, an image generation system and an image display device capable of generating and/or displaying a stereoscopic panorama image.

In order to achieve the above object, the example embodiment may adopt, for example, the following structures. It is understood that for interpreting the recitations of the claims, the range thereof is to be interpreted only based on the recitations of the claims, and that in the case where the recitations of the claims are contradictory to the description of the specification, the recitations of the claims are given priority.

The present disclosure provides one structural embodiment of an image generation method for generating a stereoscopic panorama image. The image generation method comprises acquiring panorama images respectively captured by three or more panorama cameras located in a real space; and generating a left-eye image and a right-eye image by synthesizing parts of the acquired panorama images.

The "panorama moving image" described above may have an angle of field which is equal to or greater larger than 180° in one of an up-down direction and a left-right direction. Further, the "panorama moving image" may have an angle of field of 360° in one of the directions. In the other direction, the "panorama moving image" may have an angle of field which is equal to or greater than that of the moving image to be displayed on the first display device. Further, the "panorama moving image" may have an angle of field which is equal to or greater than twice the angle of field of the moving image, equal to or greater than 120°, equal to or greater than 150°, or 180°.

According to the above, parts of the three or more panorama images captured at different points of view are synthesized to generate a left-eye image and a right-eye image, and thus the captured panorama image can be displayed stereoscopically.

The panorama images respectively captured by the panorama cameras which are respectively located in the real space at positions which are apexes of a polygon may be acquired. In this case, generating the left-eye image and the right-eye image may comprise dividing each of the acquired panorama images into divided images in accordance with image-capturing directions; and selecting an image to be used for a left-eye image and an image to be used for a right-eye image for each of the image-capturing directions from the divided images, and synthesizing the selected divided images in accordance with each of the image-capturing direction, thereby generating the left-eye image and the right-eye image.

According to the above, three or more panorama images are divided and synthesized in accordance with each of the image-capturing directions. Thus, a left-eye image and a right-eye image can be generated efficiently.

In generating the left-eye image and the right-eye image, one divided image to be used for the left-eye image and one divided image to be used for the right-eye image may be selected from the panorama image captured by each of the three or more panorama cameras.

According to the above, one divided image to be used for the left-eye image and one divided image to be used for the right-eye image are selected from the panorama image captured by one panorama camera. Owing to this, such one panorama camera can act as a left-eye camera or a right-eye camera in accordance with the image-capturing direction.

In generating the left-eye image and the right-eye image, a pair of panorama cameras to be used for the left-eye image and the right-eye image may be set for each of the image-capturing directions, and the divided images may be selected in accordance with the setting.

According to the above, a combination of the panorama images which provides an appropriate stereoscopic display can be set in accordance with the image-capturing direction.

In dividing each of the acquired panorama images, a plurality of image-capturing directions may be set such that borders therebetween extend in directions from the inside of the polygon toward the panorama cameras, and parts of each panorama image of the image-capturing directions may be provided as the divided images.

According to the above, divided images appropriate to generate a stereoscopic panorama image can be obtained.

In generating the left-eye image and the right-eye image, for selecting the divided images for the image-capturing directions, a pair of panorama cameras closest to each of the image-capturing directions may be selected among the three or more panorama cameras. The divided image of the image-capturing direction captured by the panorama camera located on the left as facing the image-capturing direction among the pair of panorama cameras may be used for the left-eye image, and the divided image of the image-capturing direction captured by the panorama camera located on the right as facing the image-capturing direction among the pair of panorama cameras may be used for the right-eye image.

According to the above, the divided images which provides an optimum stereoscopic display can be synthesized in accordance with the image-capturing direction to generate a panorama image. Thus, the panorama image can be displayed stereoscopically in all the directions.

In generating the left-eye image and the right-eye image, the images to be used for the left-eye image and the images to be used for the right-eye image may be selected in a state where from the panorama image captured by each panorama camera, the divided image including images of the other panorama cameras different from the each camera is excluded.

According to the above, a panorama image which does not include an image-capturing area where the field of view is blocked by the other panorama cameras is generated. Therefore, the dead angle area in the panorama image can be removed.

One structural example of an image display method according to the example embodiment may comprise displaying, on a display device, the left-eye image and the right-eye image generated by any one of the above-described image generation methods.

According to the above, a stereoscopic panorama image can be displayed.

The image display method may further comprise setting a display range of each of the left-eye image and the right-eye image to be displayed on the display device in accordance with an attitude of the display device. In this case, in displaying, on the display device, the left-eye image and the right-eye image, the set display range of each of the left-eye image and the right-eye image may be displayed on the display device.

According to the above, the range of the panorama image to be displayed is changed in accordance with the attitude of the display device. Therefore, the user can view the panorama image by making an operation intuitively.

The example embodiment may be implemented in the form of a non-transitory computer-readable storage medium storing an image generation program for allowing a computer to execute each of the above-described operations, an image generation system including a unit for performing each of the above-described operations, or an image display device for displaying an image generated by the above-described operations.

According to the example embodiment, parts of three or more panorama images captured at different points of view are synthesized to generate a left-eye image and a right-eye image, and thus the captured panorama image can be displayed stereoscopically.

These and other objects, features, aspects and advantages of the example embodiment will become more apparent from the following detailed description when taken in conjunction with the accompanying drawings.

BRIEF DESCRIPTION OF THE DRAWINGS

FIG. 5 shows a non-limiting example of locating arrangement of panorama cameras for capturing a stereoscopic panorama moving image and a non-limiting example of image-capturing areas of such cameras;

DETAILED DESCRIPTION OF NON-LIMITING EXAMPLE EMBODIMENTS

Figure 1:
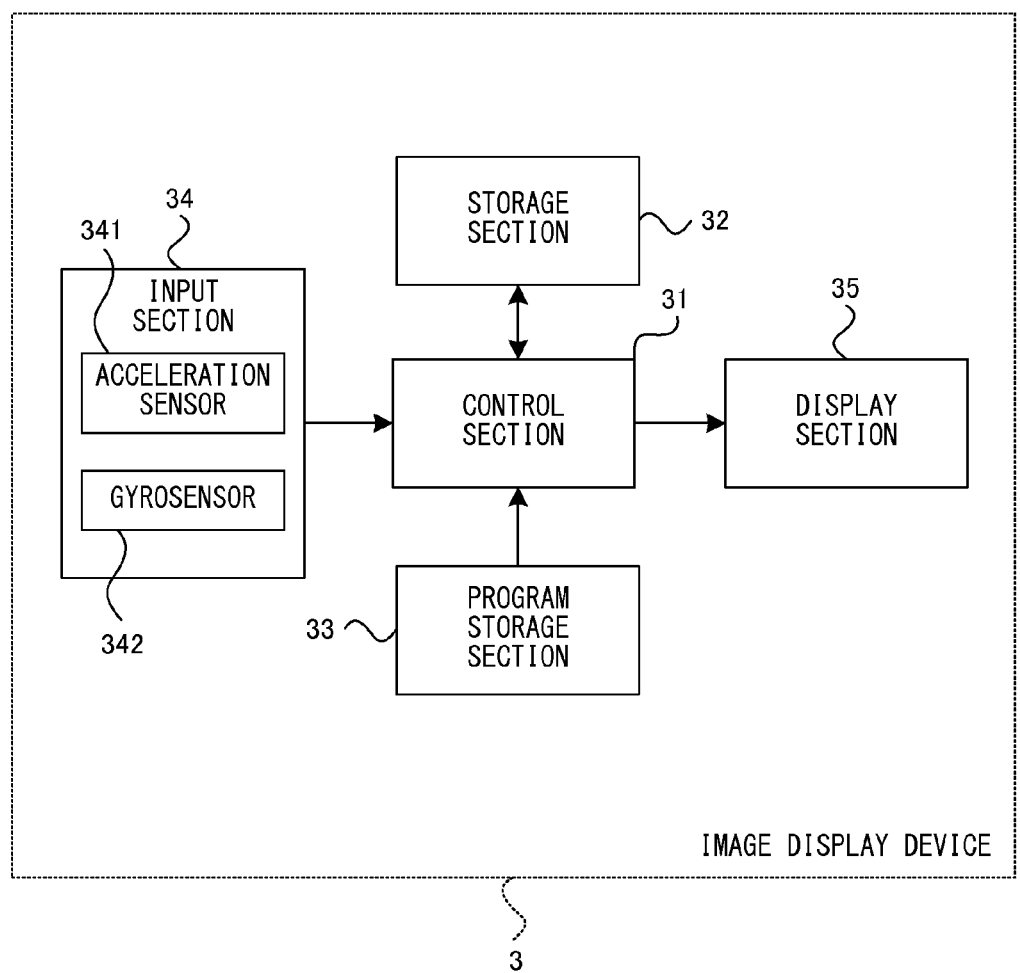
FIG. 1 is a block diagram showing a non-limiting example of an image display device 3.

With reference to FIG. 1, an image display device according to an example will be described. For example, an image display device 3 can execute an image display program or a game program stored on a storage medium such as, for example, a replaceable optical disc or memory card or received from another device. In the example embodiment, the image display device 3 generates an image (panorama image) and displays the image on a display device (display section 35). The image display device 3 may be a device such as a general personal computer, a non-portable game device, a mobile phone, a mobile game device, a PDA (Personal Digital Assistant) or the like. FIG. 1 is a block diagram showing an example of structure of the image display device 3.

As shown in FIG. 1, the image display device 3 includes a control section 31, a storage section 32, a program storage section 33, an input section 34, and the display section 35. The image display device 3 may be formed of at least one device which includes an information processing device including at least the control section 31 and another device.

The control section 31 is an information processing unit (computer) for executing various types of information processing operations, and is, for example, a CPU. The control section 31 has a function for executing various types of information processing operations, for example, a processing operation in accordance with an operation made on the input section 34 by a user. For example, the CPU executes a prescribed program, and thus various functions of the control section 31 are realized.

The storage section 32 stores various types of data usable by the control section 31 to execute the above-described information processing operations. The storage section 32 is, for example, a memory accessible by the CPU (control section 31).

The program storage section 33 stores a program. The program storage section 33 may be any storage device (storage medium) accessible by the control section 31. For example, the program storage section 33 may be a storage device provided in the information display device 3 including the control section 31, or a storage medium detachably mountable on the information display device 3 including the control section 31. Alternatively, the program storage section 33 may be a storage device connected to the control section 31 via a network (server, etc.). The control section 31 (CPU) may read a part of, or the entirety of, the game program at an appropriate timing onto the storage section 32 and execute the read program.

The input section 34 is an input device operable by the user. The input section 34 may be any input section. For example, the input section 34 includes an acceleration sensor 341 and a gyrosensor 342. The acceleration sensor 341 detects an acceleration of the image display device 3 in a prescribed axial direction (e.g., directions of three axes; may be a direction of at least one axis). The gyrosensor 342 detects an angular velocity of a rotation of the image display device 3 about a prescribed axial direction (e.g., directions of three axes; may be a direction of at least one axis). The acceleration sensor 341 and the gyrosensor 342 are sensors for detecting information usable for calculating an attitude of the image display device 3 (information usable for calculating or estimating the attitude). In other embodiments, the attitude of the image display device 3 may be calculated by any method, and may be calculated by use of a sensor other than the above-described sensors or by use of a camera capable of capturing an image of the image display device 3. The image display device 3 may include an operation section such as a slide pad, an analog stick, a cross key, buttons or the like as the input section 34.

The display section 35 displays an image as instructed by the control section 31. For example, the display section 35 is a display device utilizing LCD (Liquid Crystal Display), EL (electroluminescence) or the like. The display section 35 is a display device capable of displaying a stereoscopic image. The display section 35 is capable of displaying an image for left eye and an image for right eye by use of substantially the same display area. Specifically, the display section 35 displays left-eye images and right-eye images alternately in a lateral direction in prescribed units (e.g., row by row). For example, the display section 35 can display a naked-eye stereoscopic image. In an example, the display section 35 may be of a parallax barrier system or of a lenticular system, by which the left-eye images and the right-eye images displayed alternately in the lateral direction are distinguishable as being for the left eye and the right eye, respectively. In the case where the display section 35 is of a parallax barrier system, the display section 35 uses a parallax barrier to allow the left eye of the user to recognize the left-eye images and allow the right eye of the user to recognize the right-eye images, and thus can display an image which appears to be stereoscopic to the user (stereoscopic image). The display section 35 may not be a display device capable of displaying a naked-eye stereoscopic image, and may provide a stereoscopic image by any other method. For example, the display section 35 may provide a stereoscopic image by use of a polarizing filter method, a time division method, an anaglyph method or the like.

Figure 2:
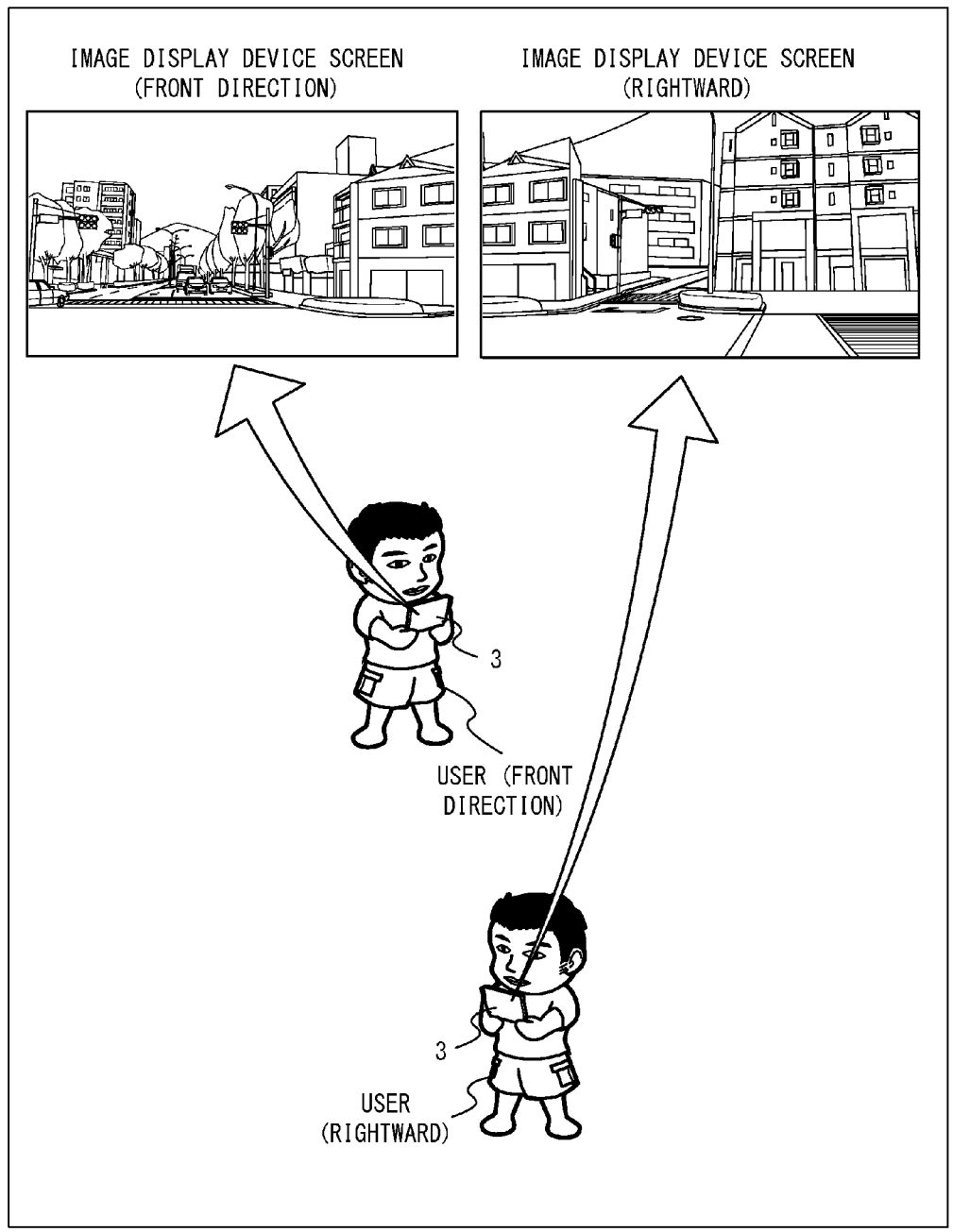
FIG. 2 shows a non-limiting example of panorama moving images (images) displayed by the image display device 3.
Figure 3:
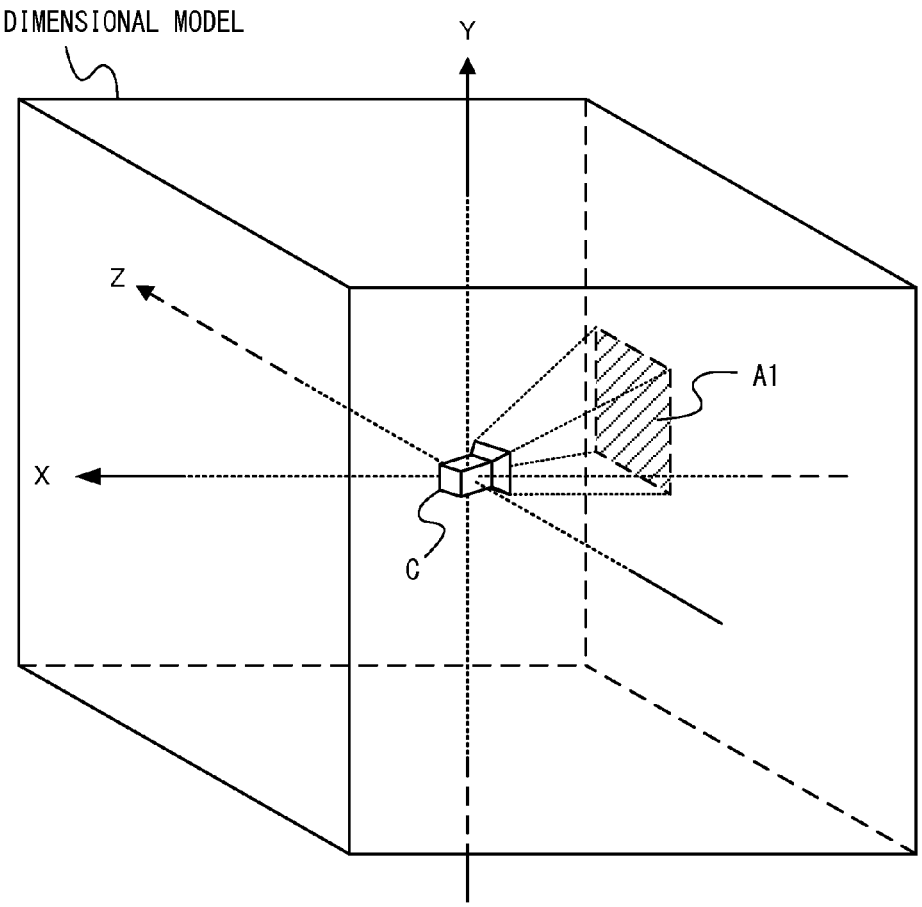
FIG. 3 shows a non-limiting example of method for determining a display range in accordance with an attitude of the image display device 3.

Now, with reference to FIG. 2 and FIG. 3, a processing operation executed by the image display device 3 for displaying a panorama image (reproducing a panorama moving image) will be described. FIG. 2 shows an example of panorama image (panorama moving image) displayed on the image display device 3. FIG. 3 shows an example of method for determining a display range in accordance with the attitude of the image display device 3.

A "panorama image" is an image having a viewing angle which is wider than that of an image displayed on a display device. Namely, a panorama image may be typically considered as an image, a part of which is displayed on a display device and a line-of-sight direction of which is changed when the display range thereof is changed. In the example embodiment, a panorama image having an omnidirectional (360°) viewing angle in an up-down direction and a left-right direction is used (see FIG. 3). However, a panorama image may have a dead angle, and may have a viewing angle of, for example, about 180°. In the example embodiment, a panorama image is a stereoscopic actual image (image of an actual object) captured by two panorama cameras. Alternatively, a panorama image may be partially or entirely a virtual image (CG image).

In the example embodiment, as the reproduction of a panorama moving image proceeds, left-eye panorama images and right-eye panorama images, each pair of which forms a frame of the stored panorama moving image, are read at a cycle of a predetermined time length and sequentially displayed on the display section 35. Namely, the left-eye panorama images and the right-eye panorama images are sequentially displayed on the display device to reproduce a stereoscopic panorama moving image. Specifically, a plurality of pairs of left-eye panorama images and right-eye panorama images included in the panorama moving image are each assigned a frame number, and the panorama image pairs are displayed in the order of the frame number. In an example, in the case where a panorama moving image which is captured while a point of view (e.g., two panorama cameras) is moved in a predetermined space (e.g., real world) as the time passes is displayed, the point of view of the panorama moving image is moved as the time passes during the reproduction. For example, as shown in FIG. 2, a panorama image of an environment as seen from a position on a street is displayed, and a panorama moving image proceeding on the street (panorama moving image, the point of view of which moves along the street) is reproduced. In another example, in the case where a panorama moving image which is captured while the point of view is not moved in a predetermined space (i.e., panorama moving image which is obtained by fixed-point image capturing) is displayed, the state of the environment around the point of view is changed as the time passes during the reproduction.

A display range displayed on the image display device 3 is changed in accordance with the attitude of the image display device 3. For example, in FIG. 2, the attitude of the image display device 3 is directed in the front direction and is directed rightward with respect to the front direction. The display ranges of the panorama image displayed on the image display device 3 are obtained when the line-of-sight is directed in the proceeding direction (front direction) and is rightward with respect to the proceeding direction. In this manner, the image display device 3 determines the display range of the panorama moving image to be displayed thereon, based on an input made on the input device (image display device 3). Owing to this, the user can freely change the line-of-sight direction (display range) by making an operation on the image display device 3 (operation of changing the attitude) while viewing the panorama moving image. In other embodiments, the display range may be determined by any method as long as being changed in accordance with an operation made by the user.

In the example embodiment, as shown in FIG. 3, a three dimensional model is located in a virtual space, and a virtual camera C is located at a prescribed position inside the three dimensional model (in the example embodiment, a position which is substantially the center of the three dimensional model). For generating an image of the three dimensional model as viewed from the virtual camera C (image of inner side surfaces of the three dimensional model), image rendering is performed as texture on the inner side surfaces of the three dimensional model. Thus, the panorama image to be displayed on the terminal device 2 is generated. Specifically, the panorama image is pasted as texture on the inner side surfaces of the three dimensional model, such that the reference direction for capturing the panorama moving image is the reference direction of the three dimensional model. Of the panorama image, a visual field of the vertical camera C (hatched area A1 in FIG. 3) is the display range. In the example embodiment, the three dimensional model is cubical. Alternatively, the three dimensional model may have any shape, for example, a spherical shape or a columnar (e.g., cylindrical) shape.

In FIG. 3, the attitude of the virtual camera C for generating an image to be displayed on the image display device 3 is controlled in accordance with the attitude of the image display device 3. Owing to this, the display range can be changed in accordance with the attitude of the image display device 3. Hereinafter, an example of controlling the attitude of the virtual camera C in accordance with the attitude of the image display device 3 will be described.

First, as initial setting, a reference attitude of the image display device 3 is set. For example, the attitude of the image display device 3 at the start of, or at a predetermined timing before the start of, the reproduction of the panorama moving image is set as the reference attitude of the image display device 3. Specifically, the attitude of the image display device 3 at the start of the reproduction of the panorama moving image may be set as the reference attitude; the attitude of the image display device 3 when the user makes a prescribed operation before the start of the reproduction of the panorama moving image may be set as the reference attitude; a predefined fixed attitude of the image display device 3 may be set as the reference attitude; or one of a plurality of predefined fixed attitudes of the image display device 3 may be selected by the user as the reference attitude. In the example embodiment, the attitude of the image display device 3 is calculated based on an output value from the gyrosensor 342, and therefore, setting of the reference attitude is resetting of the attitude value calculated by the gyrosensor 342. Alternatively, for setting the reference attitude of the image display device 3, an appropriate processing operation may be executed depending on the type of the sensor.

As initial setting, an initial attitude of the virtual camera C is set. For example, the initial attitude of the virtual camera C is set such that the line-of-sight direction (z-axis positive direction) of the virtual camera C matches a Z-axis positive direction of the virtual space (reference direction of the three dimensional model and the reference direction for capturing the panorama moving image (front direction)), a leftward direction (x-axis positive direction) of the virtual camera C matches an X-axis positive direction of the virtual space, and an upward direction (y-axis positive direction) of the virtual camera C matches a Y-axis positive direction of the virtual space.

In accordance with a change of the attitude of the image display device 3 with respect to the reference attitude (in the example embodiment, direction and amount of rotation about an xt axis, which is the left-right direction of the image display device 3 at the reference attitude, and about a yt axis, which is the up-down direction of the image display device 3 at the reference attitude), the attitude of the virtual camera C is changed from the initial attitude (typically, the virtual camera C is rotated about the x axis and y axis of the virtual camera C at the initial attitude, namely, about the X axis and the Y axis, in the same direction by the same amount as those of the rotation of the image display device 3 about the xt axis and the yt axis, respectively). In other embodiments, in accordance with a change of the attitude of the image display device 3 with respect to the reference attitude about three axes (i.e., the xt axis, the yt axis, and a zt axis, which is a front-rear direction of the image display device 3), the attitude of the virtual camera C may be changed, namely, rotated, from the initial attitude about the X axis, the Y axis and Z axis in the same direction by the same amount as those of the rotation of the image display device 3 about the xt axis, the yt axis, and the zt axis, respectively).

For displaying a left-eye panorama image and a right-eye panorama image to display a stereoscopic panorama image on the display section 35, the above-described three dimensional model and the above-described virtual camera are provided for each of the left eye and the right eye. Regarding the left-eye three dimensional model, a left-eye panorama image is rendered as texture on the inner surfaces thereof, and the left-eye virtual camera is located at the above-described position with the above-described attitude. Thus, the operation of the left-eye virtual camera is controlled. Regarding the right-eye three dimensional model, a right-eye panorama image is rendered as texture on the inner surfaces thereof, and the right-eye virtual camera is located at the above-described position with the above-described attitude. Thus, the operation of the right-eye virtual camera is controlled. An image obtained by the left-eye virtual camera thus located and an image obtained by the right-eye virtual camera thus located are displayed on the display section 35 as a left-eye image and a right-eye image, respectively. Thus, a stereoscopic panorama image (panorama moving image) can be displayed.

Figure 4:
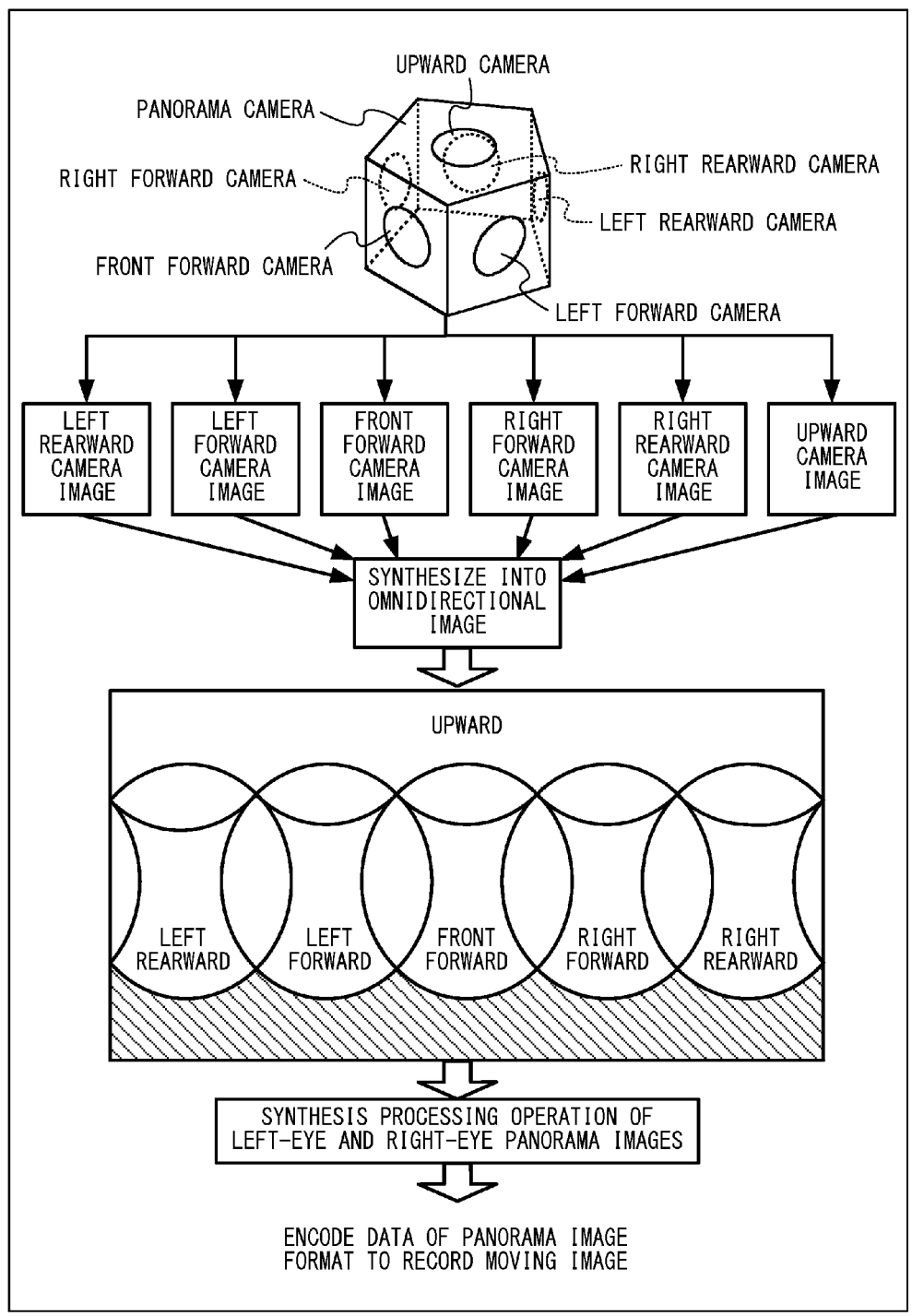
FIG. 4 shows a non-limiting example of flow of a processing operation of capturing a panorama moving image including panorama images, each of which forms a frame, and encoding and storing the panorama moving image.
Figure 6:
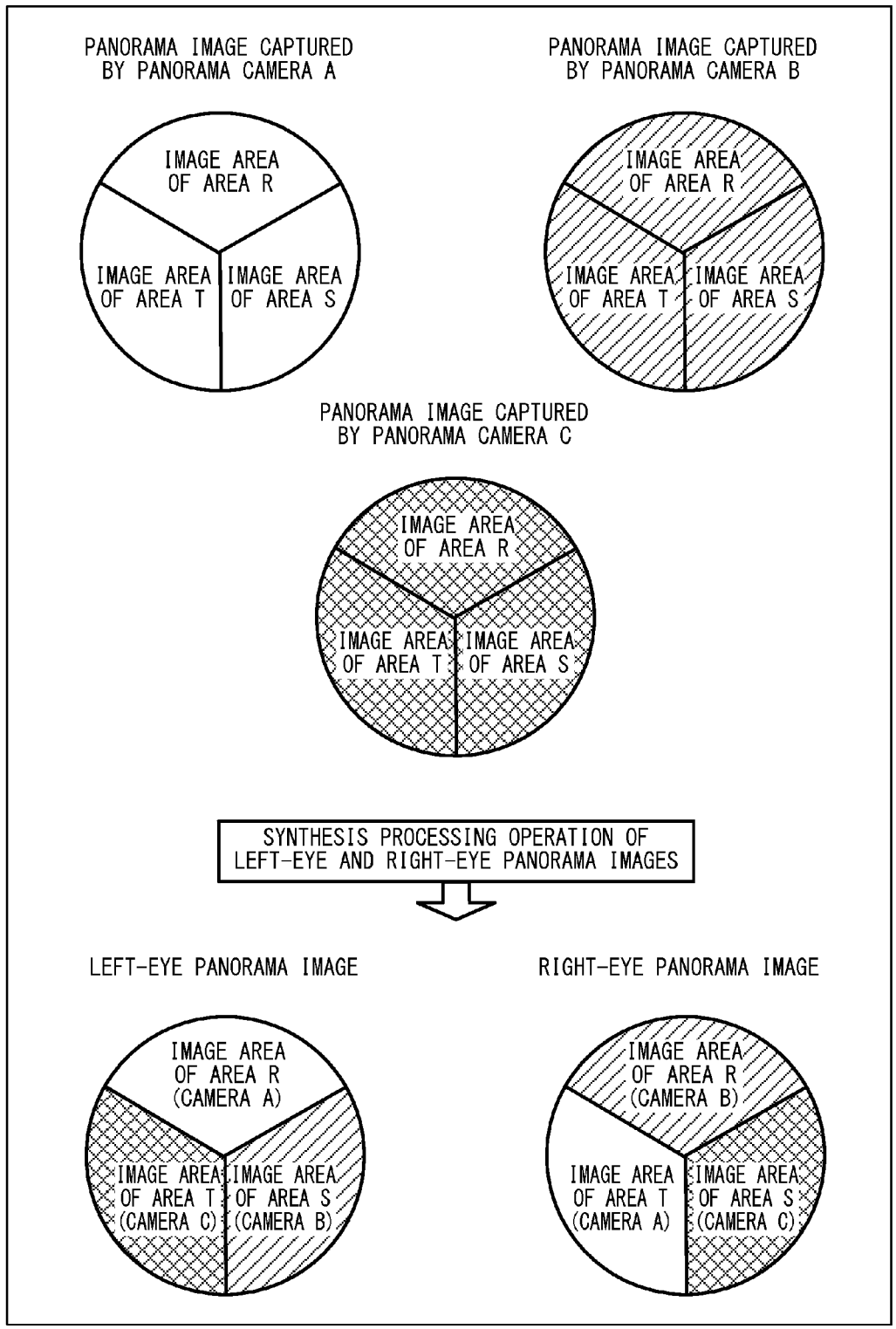
FIG. 6 shows a non-limiting example of synthesis processing operation of generating a left-eye panorama image and a right-eye panorama image from three captured panorama images.
Figure 7:
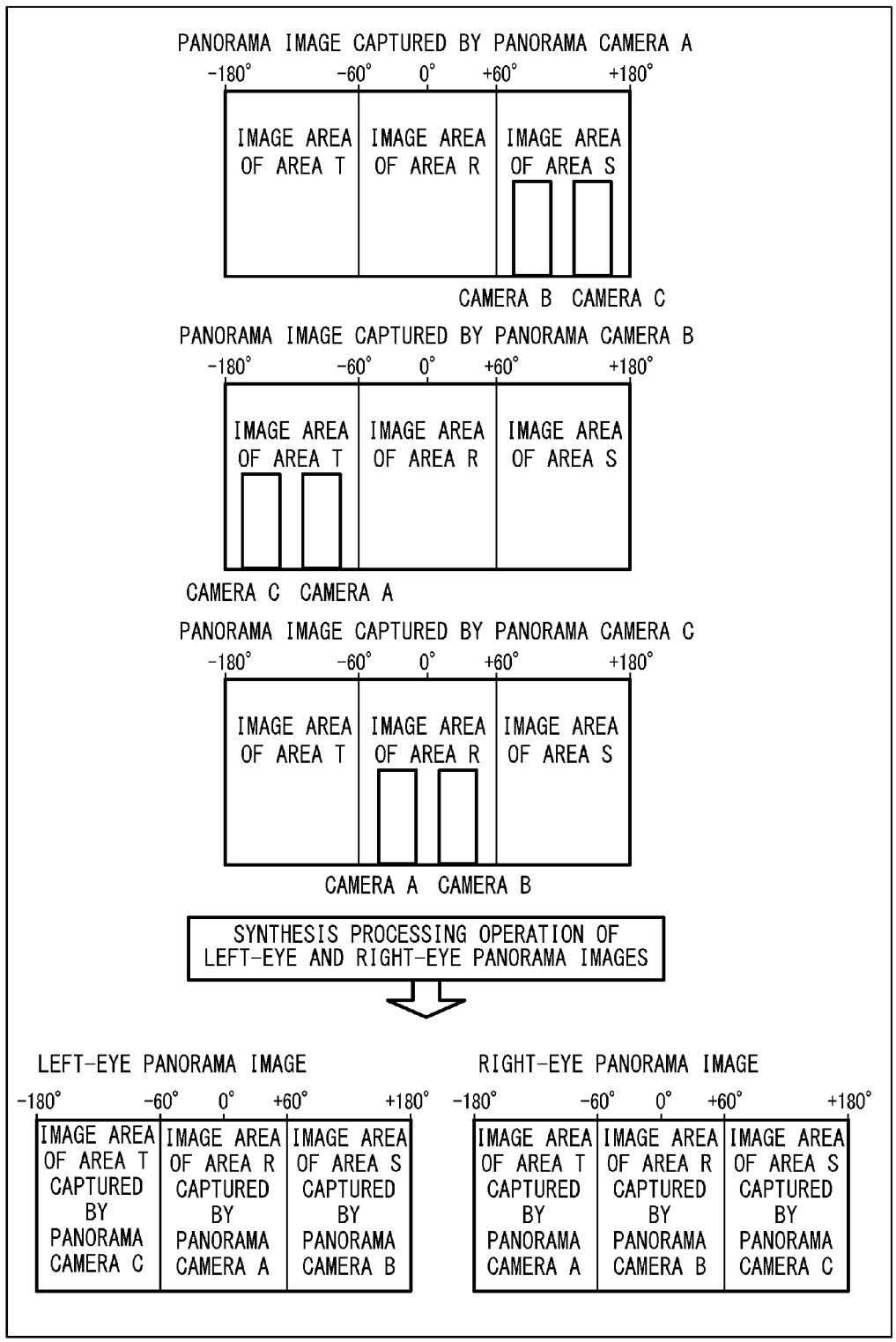
FIG. 7 shows a non-limiting example of synthesis processing operation of generating a left-eye panorama image and a right-eye panorama image from three captured panorama images.

Now, with reference to FIG. 4 through FIG. 7, a flow of a processing operation of capturing and storing a panorama moving image will be described. FIG. 4 shows an example of flow of a processing operation of capturing a panorama moving image including panorama images, each of which forms a frame, and encoding and storing the panorama moving image. FIG. 5 shows an example of locating arrangement of panorama cameras for capturing a stereoscopic panorama moving image and an example of image-capturing areas of such cameras. FIG. 6 and FIG. 7 each show an example of synthesis processing operation of generating a left-eye panorama image and a right-eye panorama image from three captured panorama images.

As shown in FIG. 4, in an example, for capturing a panorama moving image of a real world, a panorama camera including a plurality of image-capturing cameras, the image-capturing directions of which are fixed to each other, is used. For example, six image-capturing cameras are provided at fixed positions. The image-capturing directions of these cameras are, respectively, directions radiating from side surfaces and a top surface of a support member having a pentagonal prism shape. The six image-capturing cameras capture an image of the real world while moving in a forward direction, which is the direction in which one of the side surfaces is directed. The image-capturing camera provided on the side surface set as the forward direction (i.e., the side surface directed in the proceeding direction while the cameras capture the image while moving) is labeled as a "front forward camera". The image-capturing camera having the left forward direction as the image-capturing direction while moving is labeled as a "left forward camera". The image-capturing camera having the right forward direction as the image-capturing direction while moving is labeled as a "right forward camera". The image-capturing camera having the left rearward direction as the image-capturing direction while moving is labeled as a "left rearward camera". The image-capturing camera having the right rearward direction as the image-capturing direction while moving is labeled as a "right rearward camera". The image-capturing camera having the upward direction as the image-capturing direction while moving is labeled as an "upward camera". As the cameras move, images having the same time axis are obtained by the image-capturing cameras. The image obtained by the front forward camera is labeled as a "front forward camera image". The image obtained by the left forward camera is labeled as a "left forward camera image". The image obtained by the right forward camera is labeled as a "right forward camera image". The image obtained by the left rearward camera is labeled as a "left rearward camera image". The image obtained by the right rearward camera is labeled as a "right rearward camera image". The image obtained by the upward camera is labeled as an "upward camera image".

The above-described structure of the panorama cameras is one example, and another structure may be used, needless to say. A panorama moving image of the real world may be captured by the panorama camera without moving the camera (i.e., by fixed-point image capturing).

Among the images obtained by the image-capturing cameras, images of the same time axis are synthesized into one omnidirectional image (panorama image) by panorama extension. The omnidirectional image used in FIG. 4 is generated as follows. The front forward camera image is placed at a position which is to be the center of the panorama image. The left forward camera image is put to the left of, and synthesized with, the front forward camera image, and the left rearward camera image is put to the left of, and synthesized with, the left forward camera image. The right forward camera image is put to the right of, and synthesized with, the front forward camera image, and the right rearward camera image is put to the right of, and synthesized with, the right forward camera image. Then, the upward camera image is put in an area upper to, and synthesized with, the five synthesized camera images. As an image at an azimuth which is at a dead angle for the camera images (typically, a lower area of the panorama image, which is hatched in FIG. 4), a predetermined image (e.g., a black image) is provided. An omnidirectional image (panorama image) generated by synthesizing images obtained by a plurality of image-capturing cameras may not necessarily have the structure shown in FIG. 4, and may have another structure. A technique for generating a panorama image from images obtained by a plurality of image-capturing cameras is well known and will not be described herein in detail.

In the example embodiment, for capturing a stereoscopic panorama moving image, three or more panorama cameras are located in an actual space at positions which can be apexes of a polygon (for example, regular polygon). Each panorama camera performs the above-described image-capturing processing operation and also performs the above-described synthesis processing operation on the captured image. Thus, a panorama image is obtained from each panorama image. In the example embodiment, among the three or more panorama cameras, a pair of panorama cameras closest to each of the image-capturing directions are selected. Among the pair of panorama cameras, the panorama camera located on the left while facing the image-capturing direction acts as a left-eye panorama camera in the image-capturing direction, and the panorama camera located on the right while facing the image-capturing direction acts as a right-eye panorama camera in the image-capturing direction. The panorama images captured by the panorama cameras for the respective image-capturing directions are synthesized. Thus, a left-eye panorama image and a right-eye panorama image are generated. Hereinafter, in order to make the explanation specific, an example of acquiring a panorama moving image by use of three panorama cameras A through C will be described.

As shown in FIG. 5, for acquiring a panorama moving image by use of the three panorama cameras A through C, the panorama cameras A through C are located in the actual space at positions which can be apexes of a polygon (triangle in the case of using three panorama cameras; for example, regular triangle) and each capture a panorama image (panorama moving image). The area in which the panorama cameras A through C capture images of the real world is divided into a plurality of areas (in the case where there are three panorama cameras, divided into three areas). Specifically, a plurality of areas R through T are set such that borders therebetween extend in directions from the inside of the polygon toward the panorama cameras A through C. The image-capturing direction of each of the panorama cameras A through C is also divided into an image-capturing direction of the area R, an image-capturing direction of the area S, and an image-capturing direction of the area T. Where the panorama camera A is located on the left, the panorama camera B is located on the right, and the direction connecting the panorama camera A and the panorama camera B is the left-right direction, the area R represents an image-capturing direction (image-capturing range) which is forward with respect to each of the panorama cameras A and B and has an angle range of 120° (60° to the left and 60° to the right). Where the panorama camera B is located on the left, the panorama camera C is located on the right, and the direction connecting the panorama camera B and the panorama camera C is the left-right direction, the area S represents an image-capturing direction (image-capturing range) which is forward with respect to each of the panorama cameras B and C and has an angle range of 120° (60° to the left and 60° to the right). Where the panorama camera C is located on the left, the panorama camera A is located on the right, and the direction connecting the panorama camera C and the panorama camera A is the left-right direction, the area T represents an image-capturing direction (image-capturing range) which is forward with respect to each of the panorama cameras C and A and has an angle range of 120° (60° to the left and 60° to the right).

With reference to FIG. 6 and FIG. 7, a processing operation of synthesizing panorama images of the areas R through T to generate a left-eye panorama image and a right-eye panorama image will be described. In FIG. 6, each panorama image is shown as an omnidirectional panorama. In order to distinguish the images captured by the panorama cameras A through C, the images captured by the panorama camera A are represented by white areas, the images captured by the panorama camera B are represented by hatched areas, and images captured by the panorama camera C are represented by meshed areas. In FIG. 7, each panorama image is shown as having a rectangular shape longer in the lateral direction. In order to show the image-capturing directions, the angle of the central direction of the area R captured by each of the panorama cameras A through C (where the direction connecting the panorama camera A and the panorama camera B is the left-right direction, the front forward direction with respect to the panorama cameras A and B) is set as 0°, and the left direction as seen from the central direction is represented by a negative value angle and the right direction as seen from the central direction is represented by a positive value angle. In this case, the area R is an image-capturing range of −60° to +60°, the area S is an image-capturing range of +60° to +180°, and the area T is an image-capturing range of −180° to −60°.

As shown in FIG. 6 and FIG. 7, a panorama image captured by each of the panorama cameras A through C is divided into an image area of the area R, an image area of the area S and an image area of the area T. For an image area in a left-eye panorama image which shows the area R the image area of the area R captured by the panorama camera A is used. For an image area in a right-eye panorama image which shows the area R, the image area of the area R captured by the panorama camera B is used. Now, a case where the image-capturing range of the area R is captured by the panorama cameras A and B will be discussed. As shown in FIG. 5, where the panorama camera A is located on the left and the panorama camera B is located on the right, the area R is the image-capturing area formed forward with respect to the panorama cameras A and B. For displaying an image of the area R stereoscopically, it is appropriate for providing a stereoscopic appearance to use the image captured by the panorama camera A as a left-eye image and use the image captured by the panorama camera B as a right-eye image. Therefore, for the image area in the left-eye panorama image which shows the area R, the image area of the area R captured by the panorama camera A is used, and for the image area in the right-eye panorama image which shows the area R, the image area of the area R captured by the panorama camera B is used. When the resultant left-eye panorama image is displayed as a left-eye image and the resultant right-eye panorama image is displayed as a right-eye image, such display provides an appropriate stereoscopic appearance.

For an image area in the left-eye panorama image which shows the area S, the image area of the area S captured by the panorama camera B is used. For an image area in the right-eye panorama image which shows the area S, the image area of the area S captured by the panorama camera C is used. Like in the above case, a case where the image-capturing range of the area S is captured by the panorama cameras B and C will be discussed. Where the panorama camera B is located on the left and the panorama camera C is located on the right, the area S is the image-capturing area formed forward with respect to the panorama cameras B and C. Therefore, for the image area in the left-eye panorama image which shows the area S, the image area of the area S captured by the panorama camera B is used, and for the image area in the right-eye panorama image which shows the area S, the image area of the area S captured by the panorama camera C is used. Owing to this, the resultant panorama image of the area S provides an appropriate stereoscopic appearance.

For an image area in the left-eye panorama image which shows the area T, the image area of the area T captured by the panorama camera C is used. For an image area in the right-eye panorama image which shows the area T, the image area of the area T captured by the panorama camera A is used. Like in the above case, a case where the image-capturing range of the area T is captured by the panorama cameras C and A will be discussed. Where the panorama camera C is located on the left and the panorama camera A is located on the right, the area T is the image-capturing area formed forward with respect to the panorama cameras C and A. Therefore, for the image area in the left-eye panorama image which shows the area T, the image area of the area T captured by the panorama camera C is used, and for the image area in the right-eye panorama image which shows the area T, the image area of the area T captured by the panorama camera A is used. Owing to this, the resultant panorama image of the area T provides an appropriate stereoscopic appearance.

In this manner, for selecting an image for each of the left-eye panorama image and the right-eye panorama image corresponding to each image-capturing direction, a pair of panorama cameras which are closest to the image-capturing direction and have the image-capturing direction forward with respect thereto are selected among the panorama cameras A through C. A panorama image of the image-capturing direction captured by the panorama camera located on the left while facing the image-capturing direction is used as the left-eye panorama image, and a panorama image of the image-capturing direction captured by the panorama camera located on the right while facing the image-capturing direction is used as the right-eye panorama image. Owing to this, panorama images in all the image-capturing directions can be displayed stereoscopically.

When an image of the real world is captured by a plurality of panorama cameras, there is an image-capturing range which is at a dead angle (dead angle area) due to panorama cameras other than the relevant panorama camera. For example, as can be seen from FIG. 5 through FIG. 7, in the panorama image captured by the panorama camera A, the panorama cameras B and C are located in the image-capturing direction of the area S. Therefore, in the area S, the field of view is blocked by the panorama cameras B and C. In the panorama image captured by the panorama camera B, the panorama cameras C and A are located in the image-capturing direction of the area T. Therefore, in the area T, the field of view is blocked by the panorama cameras C and A. In the panorama image captured by the panorama camera C, the panorama cameras A and B are located in the image-capturing direction of the area R. Therefore, in the area R, the field of view is blocked by the panorama cameras A and B. However, when the left-eye panorama image and the right-eye panorama image are generated by the above-described synthesis processing operation, none of the areas in which the field of view of blocked by the other panorama cameras is used; namely, none of the image area of the area S captured by the panorama camera A, the image area of the area T captured by the panorama camera B, and the image area of the area R captured by the panorama camera C is used. Therefore, when the left-eye panorama image and the right-eye panorama image are generated by the above-described synthesis processing operation, any image area where the field of view is blocked by the other panorama cameras is not used. Thus, the dead angle area due to the other panorama cameras can be removed.

In the above-described specific example, three panorama cameras are used to generate a stereoscopic panorama image. Needless to say, four or more panorama cameras may be used to generate a stereoscopic panorama image. In the case where, for example, four or more panorama cameras are used, the panorama cameras are located at positions which can be apexes of a polygon corresponding to the number of the panorama cameras, and each capture panorama an image. In the synthesis processing operation, a plurality of areas (image-capturing ranges) are set such that borders therebetween extend in directions from the inside of the polygon toward the panorama cameras. The panorama images are each divided into the image areas of the plurality of areas. Among the plurality of panorama cameras, a pair of panorama cameras which are closest to each of the areas and have such an area forward with respect thereto are selected. A panorama image of the area captured by the panorama camera located on the left while facing the area is used as a left-eye panorama image, and a panorama image of the area captured by the panorama camera located on the right while facing the area is used as a right-eye panorama image. Even for generating a stereoscopic panorama image by use of four or more panorama cameras, one divided image to be used for the left-eye image and one divided image to be used for the right-eye image are selected from the divided images of the panorama image captured by each of the four or more panorama cameras. The non-selected image areas are not used for the synthesis processing operation. Owing to such a synthesis processing operation, a stereoscopic panorama image can be generated in the same manner as above also in the case where four or more panorama cameras are used.

In FIG. 6 and FIG. 7, the image areas corresponding to the areas are shown as having a fan-shape obtained as a result of dividing the omnidirectional panorama image along a straight line or a rectangular shape obtained as a result of dividing the rectangular panorama image longer in the lateral direction along a straight line. The shape of each area is not limited to a fan shape or a rectangular shape. Needless to say, the size and the shape of an image area corresponding to each image-capturing area depend on a technique of synthesizing images obtained by a plurality of image-capturing cameras to generate an omnidirectional image (panorama image) or on the processing load in the synthesis processing operation. The image areas may be obtained as a result of dividing the panorama image along a curved line or a bending line.

Returning to FIG. 4, the left-eye panorama images and the right-eye panorama images treated with the above-described synthesis processing operations are converted at a cycle of a certain time length by a prescribed method (e.g., moving image data compression encoding method standardized as H.264). Thus, all the left-eye panorama images and the right-eye panorama images are encoded and stored on a storage medium such as an optical disc or the like.

At the time of encoding and storing the panorama moving image, a plurality of panorama images (left-eye panorama images and the right-eye panorama images) included in the panorama moving image are each encoded. The encoding may be performed by use of a compression encoding method other than H.264. Any encoding method is usable for encoding each of the panorama images. For example, a method of compressing each of the panorama images, each of which forms a frame, without inter-frame dependence (e.g., motion JPEG), or a method of compressing a difference between a panorama image in the current frame and a panorama image in the immediately previous frame (e.g., MPEG), may be used. For encoding a panorama moving image by use of a frame prediction encoding method, an encoding method using intra-frame prediction may be used as well as an encoding method using inter-frame prediction.

Figure 8:
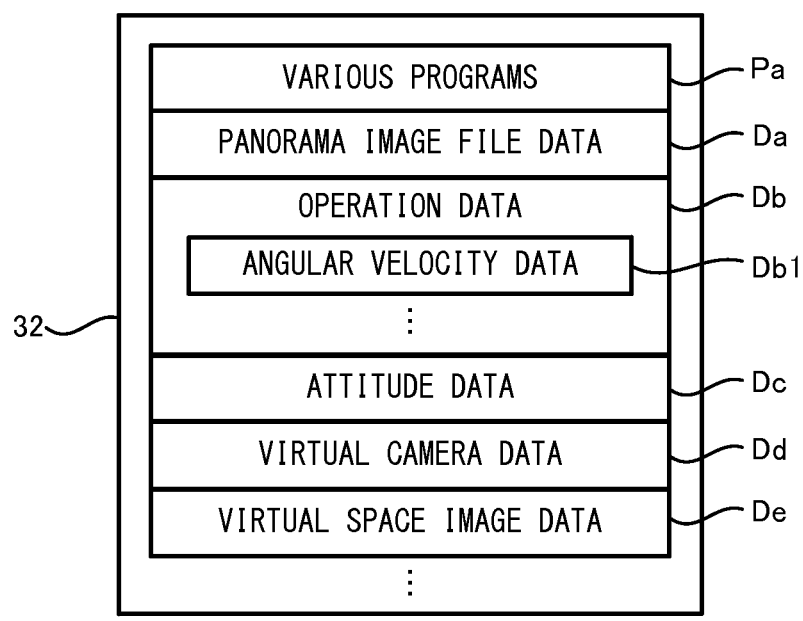
FIG. 8 shows a non-limiting example of main data and programs stored on a storage section 32 of the image display device 3.

Now, the processing operation performed by the image display device 3 will be described in detail. First, with reference to FIG. 8, main data used in the processing operation will be described. FIG. 8 shows an example of main data and programs stored on the storage section 32 of the image display device 3.

As shown in FIG. 8, in a data storage area of the storage section 32, panorama image file data Da, operation data Db, attitude data Dc, virtual camera data Dd, virtual space image data De and the like are stored. The storage section 32 may store, in addition to the data shown in FIG. 7, data usable for an application to be executed, other data usable for processing operations and the like. In a program storage area of the storage section 32, a group Pa of various programs included in an information processing program is stored.

As described above with reference to FIG. 4, the panorama image file data Da represents panorama image data of each frame of the panorama moving image obtained by decoding the encoded panorama images. The panorama image data includes data representing a left-eye panorama image and a right-eye panorama image to be pasted as texture on the inner surfaces of the above-described three dimensional models for each frame number n (1, 2, 3, . . . ). For example, the panorama image data is obtained by decoding, by a prescribed method, a stereoscopic panorama moving image, encoded and stored on a predetermined storage medium.

The operation data Db represents a content of operations made on the image display device 3, and includes angular velocity data Db1 and the like. The angular velocity data Db1 represents an angular velocity caused to the image display device 3, which is output from the gyrosensor 342.

The attitude data Dc represents the attitude of the image display device 3 in the actual space, for example, the rotation amount of the image display device 3 from the reference attitude.

The virtual camera data Dd is data regarding the left-eye virtual camera and the right-eye virtual camera respectively located at the center of the left-eye three dimensional model and at the center of the right-eye three dimensional model. For example, the virtual camera data Dd is data on the position, attitude, viewing angle (angle of field) and the like of the left-eye virtual camera and the right-eye virtual camera in the virtual space.

The virtual space image data De represents a left-eye virtual space image of the inner surfaces of the left-eye three dimensional model as viewed from the left-eye virtual camera and represents a right-eye virtual space image of the inner surfaces of the right-eye three dimensional model as viewed from the right-eye virtual camera.

Figure 9:
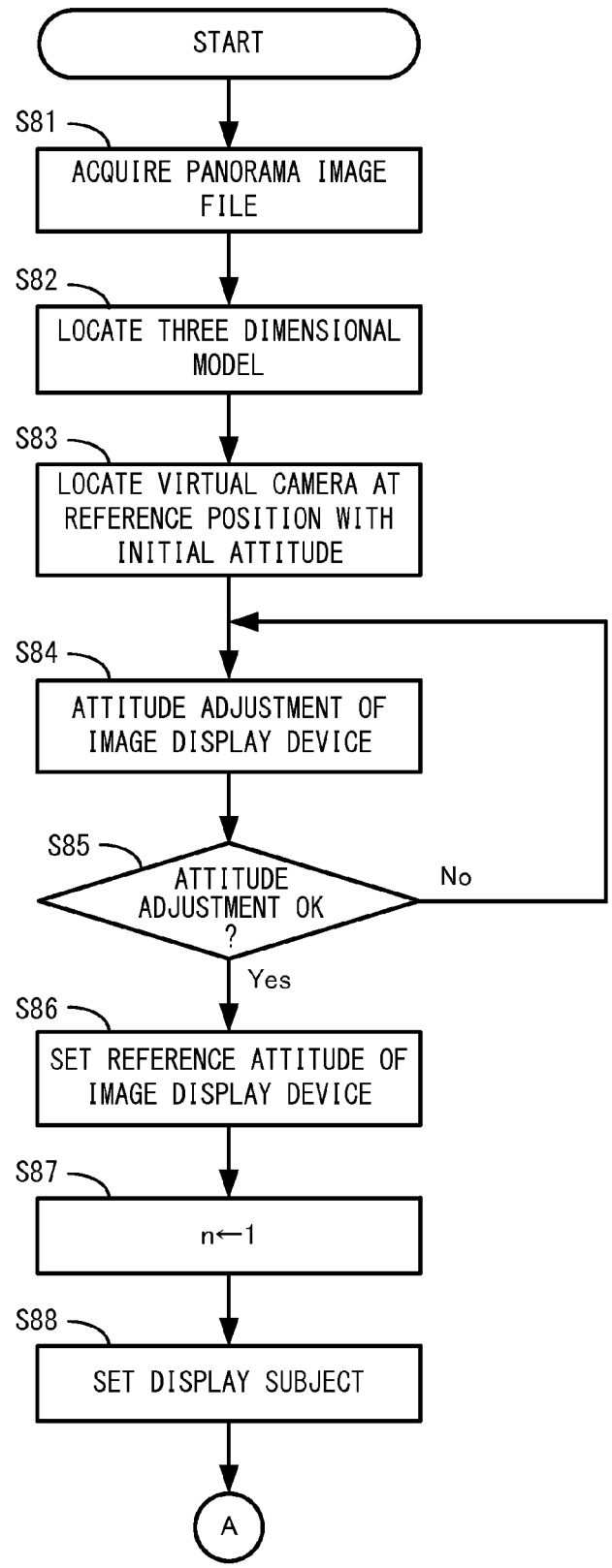
FIG. 9 is a flowchart showing a non-limiting example of first half of a processing operation executable by the image display device 3.
Figure 10:
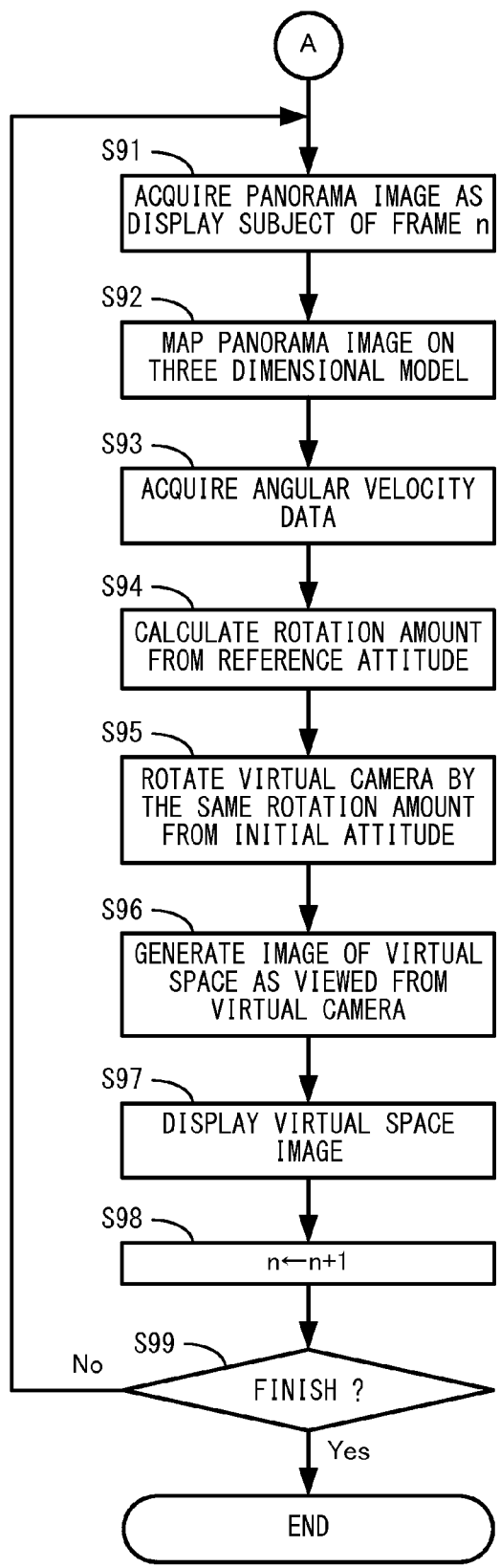
FIG. 10 is a flowchart showing a non-limiting example of second half of the processing operation executable by the image display device 3.

Now, with reference to FIG. 9 and FIG. 10, the processing operation executed by the image display device 3 will be described in detail. FIG. 9 is a flowchart showing an example of first half of a processing operation executed by the image display device 3, and FIG. 10 is flowchart showing an example of second half of the processing operation executed by the image display device 3. With reference to FIG. 9 and FIG. 10, a processing operation of displaying a stereoscopic panorama moving image on the image display device 3 will be mainly described among processing operations executed by the image display device 3. Other processing operations which are not directly related to this processing operation will not be described in detail.

The control section 31 initializes the storage section 32 (memory) and the like, and reads the image display program stored on a nonvolatile memory in the image display device 3 or on an optical disc to the storage section 32. Then, the control section 31 starts execution of the image display program. The flowcharts shown in FIG. 9 and FIG. 10 show the processing operation executed after the above processes are completed.

The steps in the flowcharts shown in FIG. 9 and FIG. 10 merely show an example. The order of the steps may be changed, or a different processing operation may be executed in addition to, or instead of, the processing operation shown in FIG. 9 and FIG. 10, as long as substantially the same results are obtained. In the example embodiment, each step in the flowcharts will be described as being executed by the control section 31. Alternatively, a part of, or the entirety of, the steps in the flowcharts may be executed by a processor other than the control section 31 or a dedicated circuit.

Referring to FIG. 9, the control section 31 acquires a panorama image file (step 81). For example, the control section 31 acquires a panorama image file from a nonvolatile memory in the image display device 3, from a storage medium mounted on the image display device 3, or from another device via a network or the like, and stores the panorama image file in the panorama image file data Da.

Next, the control section 31 locates a left-eye three dimensional model and a right-eye three dimensional model, to which the panorama moving image is to be pasted, in the virtual space such that the centers of the three dimensional models are each positioned at the origin of the virtual space (step 82), and advances the processing operation to the next step. For example, in the case where the left-eye three dimensional model and the right-eye three dimensional model are cubic, the control section 31 locates the left-eye three dimensional model and the right-eye three dimensional model with respect to XYZ axes set in the virtual space, such that a front surface of each of the left-eye three dimensional model and the right-eye three dimensional model perpendicularly crosses the Z axis on the positive side of the Z axis, a rear surface of each of the left-eye three dimensional model and the right-eye three dimensional model perpendicularly crosses the Z axis on the negative side of the Z axis, a left side surface of each of the left-eye three dimensional model and the right-eye three dimensional model perpendicularly crosses the X axis on the positive side of the X axis, a right side surface of each of the left-eye three dimensional model and the right-eye three dimensional model perpendicularly crosses the X axis on the negative side of the X axis, a top surface of each of the left-eye three dimensional model and the right-eye three dimensional model perpendicularly crosses the Y axis on the positive side of the Y axis, and a bottom surface of each of the left-eye three dimensional model and the right-eye three dimensional model perpendicularly crosses the Y axis on the negative side of the Y axis.

Next, the control section 31 locates the left-eye virtual camera and the right-eye camera at the reference position with the initial attitude (step 83), and advances the processing operation to the next step. For example, the control section 31 sets the origin of the left-eye three dimensional model and the origin of the right-eye three dimensional model (i.e., the center of the left-eye three dimensional model and the center of right-eye three dimensional model) as the reference position of the left-eye virtual camera and the right-eye virtual camera, respectively. The control section 31 sets, as the initial attitude, the attitude with which xyz axes of the left-eye virtual camera and the right-eye virtual camera (the x-axis positive direction is the leftward direction of each virtual camera, the y-axis positive direction is the upward direction of each virtual camera, and the z-axis positive direction is the line-of-sight direction of each virtual camera) match the XYZ axes of the virtual space. Then, the control section 31 updates the data on the position and the attitude of each of the left-eye virtual camera and the right-eye virtual camera in the virtual camera data Dd by use of the reference position and the initial attitude of each of the left-eye virtual camera and the right-eye virtual camera.

Next, the control section 31 urges the user to adjust the attitude of the image display device 3 (step 84) and waits for the attitude to be adjusted (step 85). Until the attitude is adjusted, steps 84 and 85 are repeated. When the attitude is adjusted, the control section 35 advance the processing operation to step 86.

In step 86, the control section 31 sets the current attitude of the image display device 3 as the reference attitude, and advances the processing operation to the next step. For example, the control section 31 initializes the attitude of the image display device 3 (rotation amount from the reference attitude) represented by the attitude data Dc (i.e., the control section 31 sets the rotation amount about each axis to 0), and sets the resultant attitude as the reference attitude of the image display device 3.

As described above, in the processes in steps 84 through 86, the attitude of the image display device 3 at the time when the process in step 84 is performed or after elapse of a prescribed time length from such a time may be set as the reference attitude; the attitude of the image display device 3 when the user makes a prescribed operation may be set as the reference attitude; a predefined fixed attitude of the image display device 3 may be set as the reference attitude; or one of a plurality of predefined fixed attitudes may be selected by the user as the reference attitude.

Next, the control section 31 sets frame number n to 1 (step 87), and advances the processing operation to the next step.

Next, the control section 31 sets a display subject to be displayed on the image display device 3 from the panorama image file data Da (step 88), and advances the processing operation to the next step 91 (see FIG. 10). For example, the control section 31 may set a predefined panorama image as the display subject, or set a panorama image selected by the user as the display subject.

Referring to FIG. 10, the control section 31 acquires a left-eye panorama image and a right-eye panorama image corresponding to frame n, among the panorama image data of the panorama image file data Da regarding the panorama moving image as the display subject (step 91), and advances the processing operation to the next step.

Next, the control section 31 maps the left-eye panorama image and the right-eye panorama image acquired in step 91 on the inner surfaces of the left-eye three dimensional model and the right-eye three dimensional model (step 92), and advances the processing operation to the next step. For example, as described above, the panorama images are mapped to the inner surfaces of the respective three dimensional models, such that the reference directions set in the left-eye panorama image and the right-eye panorama image respectively match the reference directions of the left-eye three dimensional model and the right-eye three dimensional model.

Next, the control section 31 acquires data representing an output value of the gyrosensor 342 of the image display device 3 (step 93), and advances the processing operation to the next step. Data representing the output value of the gyrosensor 342 is stored in the angular velocity data Db1 at a cycle of a predetermined time length.

Next, the control section 31 uses the data acquired in step 93 to calculate the rotation direction and the rotation amount of the image display device 3 from the reference attitude (the rotation direction and the rotation amount after the initialization in step 86) (step 94), and advances the processing operation to the next step. For example, in step 94, the rotation direction and the rotation amount about each of prescribed axial directions of the image display device 3 at the reference attitude (in the example embodiment, the xt axis direction and the yt axis direction at the reference attitude) are calculated, and the attitude data Dc is updated. The rotation direction can be represented by whether the rotation amount has a positive value or a negative value. Therefore, only data representing the rotation amount may be stored in the attitude data Dc. For example, the control section 31 adds the rotation amount based on the angular velocity acquired in step 94 in the current process to the rotation amount calculated in step 94 in the immediately previous process to find a new rotation amount.

Next, the control section 31 rotates the attitude of the left-eye virtual camera and the right-eye virtual camera in the virtual space from the initial attitude by the rotation amount calculated in step 94 (step 95), and advances the processing operation to the next step. For example, the control section 31 rotates the attitude of the left-eye virtual camera and the right-eye virtual camera from the initial attitude about the X axis direction of the virtual space (x axis direction of the virtual camera at the initial attitude) by the amount same as the rotation amount of the image display device 3 about the xt axis direction calculated in step 94, and about the Y axis direction of the virtual space (y axis direction of the virtual camera at the initial attitude) by the amount same as the rotation amount of the image display device 3 about the yt axis direction calculated in step 94. Then, the control section 31 updates the data on the attitude of the left-eye virtual camera and the right-eye virtual camera in the virtual camera data Dd.

Next, the control section 31 generates images of the inner surfaces of the left-eye three dimensional model and the right-eye three dimensional model as viewed from the left-eye virtual camera and the right-eye virtual camera (left-eye virtual space image and right-eye virtual space image) (step 96), and advances the processing operation to the next step. For example, the control section 31 uses data representing the generated left-eye virtual space image and the generated right-eye virtual space image to update the virtual space image data De.

Next, the control section 31 displays the left-eye virtual space image and the right-eye virtual space image based on the virtual space image data De on the display section 35 stereoscopically (step 97), and advances the processing operation to the next step.

Next, the control section 31 increments the frame number n (step 98), and determines whether or not to finish the processing operation (step 99). A condition or finishing the processing operation may be, for example, that reproduction of an image of the final frame of the panorama moving image which is provided for reproduction is finished, that the user makes an operation of finishing the processing operation, or the like. When the processing operation is determined not to be finished, the control section 31 returns the processing operation to step 91 and repeats the above-described processes. When the processing operation is determined to be finished, the control section 31 finishes the processing operation of the flowcharts. Until it is determined in step 99 that the processing operation is to be finished, the series of processes in steps 91 through 99 are performed in repetition.

In the example described above, the processing operation of synthesizing the panorama images captured by three or more panorama cameras is performed before the panorama image is encoded and stored on the storage medium. Alternatively, the synthesis processing operation may be performed after the panorama image is decoded by the image display device 3. For example, the panorama image captured by each panorama camera may be stored as a panorama image file, and after the panorama image file is acquired in step 81, the panorama images may be synthesized to generate a left-eye panorama image and a right-eye panorama image. Alternatively, for acquiring the left-eye panorama image and the right-eye panorama image in step 91, the panorama images captured by the panorama cameras may be acquired and synthesized to generate a left-eye panorama image and a right-eye panorama image. Still alternatively, in accordance with the display range set in step 96, the panorama images usable for the display may be synthesized to generate a left-eye panorama image and a right-eye panorama image.

In the example described above, the display range of the panorama image to be displayed on the display section 35 is changed in accordance with the attitude of the image display device 3. The display range may be changed in accordance with another operation. For example, in the case where a slide pad, an analog stick, a cross key, operation buttons or the like are provided as the input section 4, the display range may be changed in accordance with an operation made by such an operation unit. The attitude of the image display device 3 may be calculated based on only the angular velocity detected by the gyrosensor 342, based on only the acceleration detected by the acceleration sensor 341, or based on both of the angular velocity and the acceleration.

In the above description, the image display processing operation is performed by the image display device 3. Alternatively, at least a part of the processing operation in the above-described steps may be performed by another device. For example, in the case where the image display device 3 is structured to be communicable with another device (e.g., another server, another image display device, another game device, another mobile terminal), the processing operation in the above-described steps may be executed by a cooperation of the image display device 3 and such another device. In an example, the following case is conceivable: after operation data (angular velocity data) is output from the image display device 3 to another device and the processing operation of generating a virtual space image is performed by the another device, the virtual space image generated by the processing operation is displayed on the display section 35 of the image display device 3. Even when at least a part of the processing operation in the above-described steps is performed by another device in this manner, substantially the same processing operation as the above-described processing operation can be performed. Typically, the processing operation of synthesizing panorama images captured by three or more panorama cameras to generate a left-eye panorama image and a right-eye panorama image is realized by execution of a prescribed program (image generation program) by a device, which is different from the image display device 3, for performing these image processing operations. Alternatively, at least a part of the processing operation may be performed by another device. The synthesis processing operation or the image display processing operation described above can be executed by one processor or a cooperation of a plurality of processors included in an information processing system including at least one information processing device. In the example described above, the control section 31 of the image display device 3 executes a prescribed program to realize the processing operation shown in the flowcharts described above. Alternatively, a part of, or the entirety of, the processing operation may be performed by a dedicated circuit included in the image display device 3. In the example described above, the device for performing the image processing operation executes the above-described image synthesis operation. Alternatively, a part of, or the entirety of, such a processing operation may be performed by a dedicated circuit included in the device.

According to the above-described modifications, the example embodiment can be realized in a system form of so-called cloud computing or a distributed system form of wide area network or local area network. For example, in the distributed system form of local area network, the above-described processing operation can be executed by a cooperation of a non-portable information processing device (non-portable game device) and a mobile information processing device (mobile game device). In these system forms, there is no specific limitation regarding which of the devices is to perform which of the steps described above. Regardless of how the processing operation is divided among the devices, the example embodiment can be realized, needless to say.

The processing order, set values, conditions for making determinations and the like which are used in the above-described information processing operations are mere examples, and the example embodiment can be realized with other orders, other values and other conditions, needless to say.

The image generation program and the image display program described above may be supplied to a device for performing the image processing operation or the image display device 3 via an external storage medium such as an external memory or the like, or via a wired or wireless communication circuit. The above-described programs may be stored in advance on a nonvolatile storage device in the above-mentioned device. Examples of the information storage medium for storing the programs include nonvolatile memories, CD-ROMs, DVDs, optical disc-type storage mediums similar thereto, flexible discs, hard discs, magneto-optical discs, magnetic tapes and the like. The information storage medium storing the programs may be a nonvolatile memory storing the programs. Such a storage medium is considered as a storage medium readable by a computer or the like. For example, it is possible to provide the above-described various functions by causing a computer or the like to read and execute the programs stored on these storage mediums.

The systems, devices and apparatuses described herein may include one or more processors, which may be located in one place or distributed in a variety of places communicating via one or more networks. Such processor(s) can, for example, use conventional 3D graphics transformations, virtual camera and other techniques to provide appropriate images for display. By way of example and without limitation, the processors can be any of: a processor that is part of or is a separate component co-located with the stationary display and which communicates remotely (e.g., wirelessly) with the movable display; or a processor that is part of or is a separate component co-located with the movable display and communicates remotely (e.g., wirelessly) with the stationary display or associated equipment; or a distributed processing arrangement some of which is contained within the movable display housing and some of which is co-located with the stationary display, the distributed portions communicating together via a connection such as a wireless or wired network; or a processor(s) located remotely (e.g., in the cloud) from both the stationary and movable displays and communicating with each of them via one or more network connections; or any combination or variation of the above.

As described above, the example embodiment is usable for, for example, an image generation method, an image display method, an image generation program, an image generation system, an image display device and the like for the purpose of, for example, generating and/or displaying a stereoscopic panorama image.

What is claimed is:

1. An image generation method for generating a stereoscopic panorama image, comprising:

acquiring panorama images respectively captured by three or more panorama cameras located in a real space; and generating a left-eye image and a right-eye image for stereoscopic display by synthesizing parts of the acquired panorama images, wherein generating the left-eye image and the right-eye image comprises:

dividing each of the acquired panorama images into divided images in accordance with image-capturing directions, selecting an image to be used for a left-eye image and an image to be used for a right-eye image for each of the image-capturing directions from the divided images, and synthesizing the selected divided images, thereby generating the left-eye image and the right-eye image for stereoscopic display, wherein in generating the left-eye image and the right-eye image, for selecting the divided images for the image-capturing directions, a pair of panorama cameras closest to each of the image-capturing directions are selected among the three or more panorama cameras, the divided image of the image-capturing direction captured by the panorama camera located on the left as facing the image-capturing direction among the pair of panorama cameras is used for the left-eye image, and the divided image of the image-capturing direction captured by the panorama camera located on the right as facing the image-capturing direction among the pair of panorama cameras is used for the right-eye image.

2. The image generation method according to claim 1, wherein in generating the left-eye image and the right-eye image, one divided image to be used for the left-eye image and one divided image to be used for the right-eye image are selected from the panorama image captured by each of the three or more panorama cameras.

3. The image generation method according to claim 1, wherein in generating the left-eye image and the right-eye image, a pair of panorama cameras to be used for the left-eye image and the right-eye image are set for each of the image-capturing directions, and the divided images are selected in accordance with the setting.

4. The image generation method according to claim 1, wherein in dividing each of the acquired panorama images, a plurality of image-capturing directions are set such that borders therebetween extend in directions from the inside of the polygon toward the panorama cameras, and parts of each panorama image of the image-capturing directions are provided as the divided images.

5. The image generation method according to claim 1, wherein in generating the left-eye image and the right-eye image, the images to be used for the left-eye image and the images to be used for the right-eye image are selected in a state where from the panorama image captured by each panorama camera, the divided image including images of the other panorama cameras different from the each camera is excluded.

6. An image display method, comprising displaying, on a display device, a stereoscopic image including the left-eye image and the right-eye image generated by the image generation method according to claim 1.

7. The image display method according to claim 6, further comprising setting a display range of each of the left-eye image and the right-eye image to be displayed on the display device in accordance with an attitude of the display device;

wherein in displaying, on the display device, the left-eye image and the right-eye image, the set display range of each of the left-eye image and the right-eye image is displayed on the display device.

8. A non-transitory computer-readable storage medium storing an image generation program, the image generation program being executable by a computer included in an information processing device for generating a stereoscopic panorama image, wherein the image generation program, when executed by the computer, controls the computer to at least:
   acquire panorama images respectively captured by three or more panorama cameras located in a real space; and
   generate a left-eye image and a right-eye image for stereoscopic display by synthesizing parts of the acquired panorama images, wherein generating the left-eye image and the right-eye image comprises:
   dividing each of the acquired panorama images into divided images in accordance with image-capturing directions, selecting an image to be used for a left-eye image and an image to be used for a right-eye image for each of the image-capturing directions from the divided images, and synthesizing the selected divided images, thereby generating the left-eye image and the right-eye image for stereoscopic display,
   wherein in generating the left-eye image and the right-eye image, for selecting the divided images for the image-capturing directions, a pair of panorama cameras closest to each of the image-capturing directions are selected among the three or more panorama cameras, the divided image of the image-capturing direction captured by the panorama camera located on the left as facing the image-capturing direction among the pair of panorama cameras is used for the left-eye image, and the divided image of the image-capturing direction captured by the panorama camera located on the right as facing the image-capturing direction among the pair of panorama cameras is used for the right-eye image.

9. An image generation system for generating a stereoscopic panorama image, comprising a processing system, including at least one computer processor, the processing system being configured to perform operations comprising:
   acquiring panorama images respectively captured by three or more panorama cameras located in a real space;
   generating a left-eye image and a right-eye image by synthesizing parts of the acquired panorama images, wherein generating the left-eye image and the right-eye image comprises:
   dividing each of the acquired panorama images into divided images in accordance with image-capturing directions, selecting an image to be used for a left-eye image and an image to be used for a right-eye image for each of the image-capturing directions from the divided images, and synthesizing the selected divided images, thereby generating the left-eye image and the right-eye image for stereoscopic display,
   wherein in generating the left-eye image and the right-eye image, for selecting the divided images for the image-capturing directions, a pair of panorama cameras closest to each of the image-capturing directions are selected among the three or more panorama cameras, the divided image of the image-capturing direction captured by the panorama camera located on the left as facing the image-capturing direction among the pair of panorama cameras is used for the left-eye image, and the divided image of the image-capturing direction captured by the panorama camera located on the right as facing the image-capturing direction among the pair of panorama cameras is used for the right-eye image; and
   generating a stereoscopic display using the left-eye image and the right-eye image.

10. An image display device for displaying a stereoscopic panorama image, comprising:
    a display; and
    a display controller, comprising at least one processor, the display controller configured to:
    generate a left-eye panoramic image and a right-eye panoramic image for stereoscopic display by synthesizing parts of panorama images respectively captured by three or more panorama cameras located in a real space, wherein generating the left-eye panoramic image and the right-eye panoramic image comprises:
       dividing each of the panorama images into divided images in accordance with image-capturing directions, selecting an image to be used for a left-eye image and an image to be used for a right-eye image for each of the image-capturing directions from the divided images, and synthesizing the selected divided images, thereby generating the left-eye panoramic image and the right-eye panoramic image for stereoscopic display,
       wherein in generating the left-eye panoramic image and the right-eye panoramic image, for selecting the divided images for the image-capturing directions, a pair of panorama cameras closest to each of the image-capturing directions are selected among the three or more panorama cameras, the divided image of the image-capturing direction captured by the panorama camera located on the left as facing the image-capturing direction among the pair of panorama cameras is used for the left-eye panoramic image, and the divided image of the image-capturing direction captured by the panorama camera located on the right as facing the image-capturing direction among the pair of panorama cameras is used for the right-eye panoramic image; and
    stereoscopically display, on the display, the generated left-eye panoramic image and the generated right-eye panoramic image.

11. The image display device of claim 10, wherein stereoscopically displaying the generated left-eye panoramic image and the generated right-eye panoramic image includes displaying a portion of the generated left-eye image and a portion of the generated right-eye image and the display controller is further configured to change the displayed portions of the left-eye image and the right-eye image in accordance with a change in an attitude of the image display device.

12. The image display device of claim 10, further comprising a motion sensor providing motion data, and the display controller is further configured to change, in accordance with a change in an attitude of the display device calculated using the motion data of the motion sensor, a display range of the generated left-eye panoramic image and the generated right-eye panoramic image stereoscopically displayed on the display.

13. The image display device of claim 10, wherein the display controller is further configured to generate a plurality of pairs of left-eye images and right-eye images, and the pairs of images are sequentially displayed on the display to provide a stereoscopic panorama moving image.

14. The image display device of claim 10, wherein the left-eye panoramic image includes parts of each of the panorama images respectively captured by the three or more panorama cameras, and the right-eye panoramic image includes parts of each of the panorama images respectively captured by the three or more panorama cameras.

15. The image generation method according to claim 1, wherein the left-eye image includes parts of each of the acquired panorama images respectively captured by the three or more panorama cameras, and the right-eye image includes parts of each of the acquired panorama images respectively captured by the three or more panorama cameras.

16. The image generation method according to claim 1, wherein each acquired panorama image from the three or more panorama cameras is an omnidirectional image captured by a plurality of cameras included in the respective panorama camera.

* * * * *